United States Patent Office 3,148,024
Patented Sept. 8, 1964

3,148,024
PROCESS FOR REMOVING IRON FROM AN INORGANIC ALUMINUM SALT SOLUTION
John C. Hayes, Palatine, and Edward J. Bicek, La Grange, Ill., assignors to Universal Oil Products Company, Des Plaines, Ill., a corporation of Delaware
No Drawing. Filed Oct. 29, 1962, Ser. No. 233,892
7 Claims. (Cl. 23—92)

The present invention relates to the purification of aluminum salt solutions, and is more particularly directed toward a method for reducing the concentration of metallic contaminants contained within said aluminum salt solutions. The present invention affords a method by which the iron concentration of an aluminum salt solution is reduced to a level such that said aluminum salt solution is considered substantially completely iron-free.

Aluminum salt solutions, particularly the chloride, sulfate and nitrate, are employed, as the source of aluminum, in the preparation of an aluminum-containing refractory inorganic oxide. Alumina, in its many anhydrous forms, as aluminum oxide hydrate, or aluminum hydroxide, is utilized extensively within the chemical and petroleum industries. It may be employed as a catalytic component in and of itself, quite often serves as the carrier material for other catalytically active metallic and non-metallic components, and is used as a dehydrating, treating or purifying agent. Various physical modifications of alumina possess an especially desired type of catalytic activity, as well as a high degree of adsorptive capacity. Regardless of its ultimate intended use, it is generally necessary that the alumina be substantially pure, and especially free from metallic contaminants which, if present, possess the tendency to induce adverse effects with respect to the functions previously described. This is particularly true in those instances where the alumina is utilized as a carrier material in the preparation of a catalytic composite. The metallic contaminants, particularly iron, copper, lead, antimony, etc., originally present in the aluminum salt solution serving as the source of the alumina, are retained during the preparation of the latter and appear therein in significantly deleterious concentrations. Notwithstanding that alumina is often combined with other refractory inorganic oxides including silica, magnesia, thoria, titania, boria, zirconia, hafnia, etc. and mixtures of the same, in order to prepare various catalytic composites intended for particular purposes, the presence of the metallic contaminants induces deleterious effects in regard to the desired catalytic action.

A primary object of the present invention is to provide a method for the removal of metallic contaminants from aluminum salt solutions. The present invention affords particular advantages in reducing the concentration of iron in an aluminum salt solution intended as the source of alumina, the latter being ultimately intended for use as the carrier material in the preparation of catalytic composites.

In a broad embodiment, therefore, the present invention relates to a method for removing iron from an aluminum salt solution, which method comprises contacting said solution with aluminum cupferrate, thereby forming an iron-cupferron complex and removing said solution substantially reduced in iron concentration.

Another broad embodiment of the present invention affords a method for reducing the concentration of iron in a first aluminum salt solution, which method comprises initially precipitating aluminum cupferrate from a solution of a second aluminum salt and cupferron, contacting said first aluminum salt solution with the precipitated aluminum cupferrate, thereby forming an iron-cupferron complex, and removing said first solution substantially reduced in iron concentration.

A limited embodiment of the present invention involves a method of preparing an aluminum salt solution substantially free from iron, which method comprises precipitating aluminum cupferrate from an iron-free solution of aluminum chloride and cupferron, contacting an iron-containing aluminum salt solution with the resulting wet precipitate, thereby forming an iron-cupferron complex, and removing said aluminum salt solution from said aluminum cupferrate substantially free from iron.

From the foregoing embodiments, it will be readily ascertained that the method of the present invention is directed toward the purification of aluminum salt solutions. Although having particular applicability toward the removal of iron from aluminum salt solutions containing the same, it is understood that the method of the present invention will effect a reduction in the concentration of other metallic contaminants including copper, lead, antimony, etc. The greater majority of the sources of aluminum, whether naturally-occurring such as clays, earths, ores, etc., or synthetically-prepared such as the aluminum solutions obtained by strong acid digestion of deactivated catalytic composites during the recovery of the catalytically active metallic components, contain quantities of metallic contaminants, and particularly iron, in excessive concentrations. As such, these sources of aluminum are not entirely suitable for utilization in the preparation of alumina, and particularly such alumina as is intended for use in the subsequent preparation of catalytic composites.

Many techniques are available to reduce the concentration of iron and other metallic contaminants to a level such that the aluminum salt solution may be considered substantially iron-free. Such methods include the use of digestion techniques, alternative precipitation and dissolution techniques, ion-exchange resins, various combinations of these, etc. However, the utilization of such techniques is generally both tedious and involves the use of relatively expensive materials in order that the iron concentration be reduced to an acceptable level. We have found that a substantially iron-free aluminum salt solution may be readily obtained utilizing the relatively inexpensive material cupferron, and a relatively simple method which is neither tedious, time consuming, nor expensive in operation.

Briefly, the method of the present invention comprises contacting the contaminated aluminum salt solution with precipitated aluminum cupferrate. It is recognized that the utilization of cupferron as a specific precipitant for metals such as iron and copper is known. However, attempts to utilize cupferron in the generally accepted fashion to selectively precipitate such metallic contaminants from concentrated solutions of aluminum salts, such as aluminum chloride and/or aluminum sulfate, will not result in an acceptable degree of decontamination due to the formation of voluminous flocculent precipitates containing primarly the aluminum complex of cupferron. Thus, the use of cupferron as is, not only does not reduce the concentration of the metallic contaminants to an acceptable level, but decreases the quantity of aluminum in the treated material. We have found, however, that the precipitant cupferron may be employed by a method which comprises initially forming aluminum cupferrate as a precipitate from an aqueous solution of cupferron and a solution of an aluminum salt such as aluminum chloride, aluminum sulfate, aluminum nitrate, etc. It is necessary that such aluminum salt be substantially completely iron-free in order that the voluminous flocculent precipitates of aluminum complexes otherwise forming in the presence of iron are not experienced. Although the precipitated aluminum cupferrate may be utilized directly, it is preferred to precipitate the same in the presence of a filter aid such as activated carbon, asbestos, sawdust, fullers earth, Celite, other diatomaceous earths, etc., for the purpose of increasing the porosity and permeability of the aluminum cupferrate. The wet, precipitated aluminum cupferrate is transferred to a suitable vessel, preferably a cylindrical column, and is compacted into a relatively solid bed. The solution to be purified, for example a concentrated aluminum chloride or aluminum sulfate solution resulting from a process designed to recover catalytically active metals, and containing deleterious quantities of iron, is passed through the column, preferably in downward flow, contacting the aluminum cupferrate, thereby forming iron-cupferron complexes. Aluminum is displaced from the aluminum cupferrate, and the material within the column gradually changes color from a light tan, or amber, to red, the characteristic color of the iron-cupferron complex. This color change affords an indication of the quantity of aluminum cupferrate remaining within the column having the capacity for additional iron removal.

The iron-free aluminum salt solution utilized in conjunction with cupferron in the preparation of the precipitated aluminum cupferrate, may comprise the same or a different anion as that of the solution from which the metallic contaminants are to be removed. Thus, the aluminum cupferrate may be prepared from an aluminum chloride solution, and the iron ultimately removed from either aluminum chloride and/or aluminum sulfate. Conversely, the aluminum cupferrate may be prepared from an iron-free aluminum nitrate solution, for use in the removal of iron from aluminum chloride, aluminum sulfate, aluminum nitrate, etc.

*Example*

A 28.0% by weight solution of aluminum chloride, having an iron concentration of 0.09 milligram per milliliter, was obtained from a process designed to recover platinum from a composite of platinum and alumina through a method utilizing hydrochloric acid. In its untreated state, the aluminum chloride could not be utilized directly in the preparation of an aluminum-containing hydrosol from which alumina particles might be prepared. Approximately one-half of this aluminum chloride solution was admixed with cupferron with the result that a voluminous flocculent precipitate was immediately formed. Upon analysis, the flocculent precipitate indicated the presence of a minor quantity of iron-cupferron complexes, the greater proportion being aluminum complexes of cupferron. The unprecipitated aluminum chloride solution was found to contain iron in excess of 0.01 milligram per milliliter.

A precipitate of an aluminum-cupferron complex was prepared by adding an aqueous solution of cupferron to a concentrated solution of iron-free aluminum chloride, in the presence of a filter aid (Celite). The resulting wet precipitated aluminum cupferrate was transferred to a cylindrical column in the form of a relatively compact bed. The second half of the 28% by weight solution of aluminum chloride, containing 0.09 milligram of iron per milliliter, was passed through the top of the column containing the fresh preparation of the aluminum cupferrate. Analysis of the column effluent indicated an iron concentration of less than 0.01 milligram per milliliter, and there was no evidence of the formation of a flocculent precipitate of aluminum-cupferron complexes within the column.

The foregoing specification and example indicate the method by which the present invention is effected, and illustrates the advantages afforded through its use in the preparation of substantially iron-free aluminum salt solutions.

We claim as our invention:

1. A method for removing iron from an inorganic aluminum salt solution which comprises contacting said solution with aluminum cupferrate, thereby forming an iron-cupferron complex and removing said solution substantially reduced in iron concentration.

2. A method for reducing the concentration of iron in a first inorganic aluminum salt solution which comprises initially precipitating aluminum cupferrate from a solution of a second inorganic aluminum salt and cupferron, contacting said first aluminum salt solution with the precipitated aluminum cupferrate, thereby forming an iron-cupferron complex, and removing said first solution substantially reduced in iron concentration.

3. The method of claim 2 further characterized in that said second aluminum-salt solution is substantially iron-free.

4. The method of claim 2 further characterized in that said first aluminum salt solution is aluminum chloride.

5. The method of claim 2 further characterized in that said first aluminum salt solution is aluminum sulfate.

6. The method of claim 2 further characterized in that said first and second aluminum salt solutions comprise identical anions.

7. A method of preparing an aluminum salt solution substantially free from iron which comprises precipitating aluminum cupferrate from an iron-free solution of aluminum chloride and cupferron, contacting an iron-containing inorganic aluminum-salt solution with the resulting wet precipitate, thereby forming an iron-cupferron complex, and removing said aluminum salt solution from said aluminum cupferrate substantially free from iron.

References Cited in the file of this patent

FOREIGN PATENTS

| | | |
|---|---|---|
| 397,412 | Great Britain | Aug. 24, 1933 |
| 399,772 | Great Britain | Oct. 12, 1933 |